(12) United States Patent
Jang et al.

(10) Patent No.: US 10,694,802 B2
(45) Date of Patent: Jun. 30, 2020

(54) HELMUT PROVIDED WITH RADAR REFLECTOR

(71) Applicants: Hye Young Jang, Changwon-si (KR); Hong Jin Kim, Changwon-si (KR)

(72) Inventors: Hye Young Jang, Changwon-si (KR); Hong Jin Kim, Changwon-si (KR)

( * ) Notice: Subject to any disclaimer, the term of this patent is extended or adjusted under 35 U.S.C. 154(b) by 450 days.

(21) Appl. No.: 15/637,861

(22) Filed: Jun. 29, 2017

(65) Prior Publication Data

US 2018/0000184 A1  Jan. 4, 2018

(30) Foreign Application Priority Data

Jun. 29, 2016 (KR) .................. 10-2016-0082005

(51) Int. Cl.
| | |
|---|---|
| *A42B 3/04* | (2006.01) |
| *A42B 3/06* | (2006.01) |
| *F21V 33/00* | (2006.01) |
| *H01Q 1/27* | (2006.01) |
| *F21S 4/26* | (2016.01) |
| *H01Q 15/18* | (2006.01) |
| *G01S 13/931* | (2020.01) |
| *F21Y 103/30* | (2016.01) |
| *F21Y 115/10* | (2016.01) |

(52) U.S. Cl.
CPC ............ *A42B 3/061* (2013.01); *A42B 3/0453* (2013.01); *F21S 4/26* (2016.01); *F21V 33/0008* (2013.01); *F21V 33/0076* (2013.01); *H01Q 1/273* (2013.01); *H01Q 15/18* (2013.01); *F21Y 2103/30* (2016.08); *F21Y 2115/10* (2016.08); *G01S 2013/9329* (2020.01)

(58) Field of Classification Search
CPC .......... A42B 3/0453; A42B 3/061; F21S 4/26; F21V 33/0008; F21V 33/0076; F21Y 2103/30; F21Y 2115/10; G01S 2013/9339; H01Q 15/18; H01Q 1/273
USPC .......................................................... 342/7
See application file for complete search history.

(56) References Cited

U.S. PATENT DOCUMENTS

2014/0268839 A1* 9/2014 Timmerberg .......... A43B 3/001
362/473

FOREIGN PATENT DOCUMENTS

| KR | 10-2005-0020654 A | 3/2005 |
|---|---|---|
| KR | 10-1511858 B1 | 4/2015 |

* cited by examiner

*Primary Examiner* — Timothy A Brainard
(74) *Attorney, Agent, or Firm* — Novick, Kim & Lee, PLLC; Jae Youn Kim

(57) ABSTRACT

Disclosed is a helmet provided with a radar reflector. The helmet includes a helmet body formed in a shape corresponding to a shape of a user head, and the radar reflector mounted on an outer surface of the helmet body to reflect a radar signal transmitted from radar equipment. The radar reflector includes a plurality of reflection units each concaved in a trigonal pyramid shape having one opened surface, each of the plurality of reflection units reflecting the radar signal. Thus, by applying the radar reflector to the helmet of a user aboard an object to be detected by using a radar signal, the radar signal is effectively reflected in bad weather or at night, thereby improving the recognition rate of radar equipment.

8 Claims, 3 Drawing Sheets

HELMUT PROVIDED WITH RADAR REFLECTOR

BACKGROUND OF THE INVENTION

1. Field of the Invention

The present invention relates to a helmet provided with a radar reflector, and more particularly, to a helmet provided with a radar reflector which reflects a radar signal used for recognizing a wearer wearing a helmet.

2. Description of the Related Art

In recent years, driver-assistance systems for various kinds of moving objects (such as a car, a motorcycle, an airplane, and the like) have been actively developed for the purpose of improving the safety and comfort of driving. The driver assistance system is a safety device for a vehicle which uses a high-technology sensor to detect the risk of collision in the same concept as a driver perceives through visual, auditory and tactile factors, alerts the driver of the risk of an accident, and actively performs deceleration or emergency braking to avoid front/rear collision. In addition, the driver assistance system may perform lane departure warning, blind spot monitoring, and improved rearward monitoring.

Such a driver assistance system may be classified into various types according to the functions.

A forward collision warning system (FCW) is a system that provides visual, auditory, and tactile warning to a driver for the purpose of avoiding collision with the forward vehicle by detecting the vehicle travelling in the same direction ahead of the driving lane.

An advanced emergency braking system (AEBS) is a system that detects the possibility of collision with a vehicle located in front of the driving lane and warns the driver. If the driver does not respond or it is determined that a collision is inevitable, the system automatically brakes the vehicle for the purpose of mitigating and avoiding a collision.

An adaptive cruise control (ACC) is a system that allows a vehicle to autonomously travel at a speed set by the driver. When a preceding vehicle which travels at a predetermined speed or less set by the driver is present during autonomous driving, the system controls such that the vehicle follows the preceding vehicle not to interfere with the traffic flow.

A cyclist detection system is a system that warns a driver of the risk of collision to prevent collision by detecting bikes around the vehicle.

In addition, a lane departure warning system (LDWS), a lane keeping assist system (LKAS), a blind spot detection (BSD), a rear-end collision warning system (RCW), a smart parking assist system (SPAS), and the like have been used.

For example, driver assistance systems for recognizing a pedestrian or a motorcycle have been disclosed in Patent document 1 and Patent document 2 described below.

Such a driving support system uses various types of sensors, such as a vehicle radar, an ultrasonic sensor, and the like, in order to detect a pedestrian more accurately and to detect the distance from the pedestrian.

DOCUMENT OF RELATED ART

Patent Document (Patent document 1) Korean Registered Patent No. 10-1511858 (issued on Apr. 13, 2015)

(Patent document 2) Korean Registered Patent No. 10-1179245 (issued on Sep. 3, 2012)

SUMMARY OF THE INVENTION

However, there is a limitation in the performance of each sensor applied to a driver-assistance system. In addition, when a failure or an error occurs in the sensor, the reliability of the entire apparatus is deteriorated, and the safety of a driver and a pedestrian is seriously affected.

Specifically, the sensing ability of a vehicle radar applied to a driver-assistance system is significantly deteriorated in bad weather such as heavy rain, fog, heavy snow, hail, or the like, and at night.

Therefore, it has been required to develop a technology capable of improving the recognition rate of a vehicle radar by effectively reflecting a radar signal in bad weather and at night.

To solve the problems described above, an object of the present invention is to provide a helmet provided with a radar reflector which is capable of reflecting a radar signal to improve a recognition rate.

Another object of the present invention is to provide helmet provided with radar reflector that is capable of effectively reflect a radar signal incident in various directions by installing a radar reflector at the highest position in moving object.

To achieve the objects described above, according to one aspect of the present invention, there is provided a helmet provided with a radar reflector, which includes: a helmet body formed in a shape corresponding to a shape of a user head; and the radar reflector mounted on an outer surface of the helmet body to reflect a radar signal transmitted from radar equipment, wherein the radar reflector includes a plurality of reflection units each concaved in a trigonal pyramid shape having one opened surface, each of the plurality of reflection units reflecting the radar signal; and a light emitting module for emitting light to a periphery thereof by turning on or off a plurality of LEDs, wherein the radar reflector is mounted over an entire outer surface of the helmet body, wherein the reflection unit reflects an incident radar signal by using each reflection surface formed inside the opened surface when the radar signal is input through the opened surface, wherein each side of the reflection unit has a length longer than a wavelength of the radar signal, and wherein the light emitting module includes a transparent tube installed in a longitudinal direction of the radar reflector; an LED strip provided in the transparent tube and provided with the plurality of LEDs mounted at predetermined intervals; and a power supply unit for supplying power to the LED strip.

According to another aspect of the present invention, there is provided a helmet provided with a radar reflector, which includes a helmet body formed in a shape corresponding to a shape of a user head; and the radar reflector mounted on an outer surface of the helmet body to reflect a radar signal transmitted from radar equipment, wherein the radar reflector includes a plurality of reflection units each concaved in a trigonal pyramid shape having one opened surface, each of the plurality of reflection units reflecting the radar signal; and a light emitting module for emitting light to a periphery thereof by turning on or off a plurality of LEDs, wherein the reflection units are arranged in a plurality of rows to be formed in a headband shape or a band shape, and mounted on the outer surface of the helmet body in a partial attachment scheme or a coupling scheme, wherein each side of the reflection unit has a length longer than a wavelength of the radar signal, and wherein the light emitting module includes a transparent tube installed in a longitudinal direction of the radar reflector; an LED strip provided in the transparent tube and provided with the plurality of LEDs mounted at predetermined intervals; and a power supply unit for supplying power to the LED strip.

As described above, according to the helmet provided with a radar reflector of the present invention, the radar signal may be effectively reflected, which is input thereto in various directions from radar equipment for detecting the presence or absence of the object to be detected by applying a radar reflector to the outer surface of the helmet, the moving speed, the moving direction, and the distance from the object.

In addition, according to the present invention, the recognition rate may be improved by applying the radar reflector to the helmet of a user disposed at the highest position of a fast moving object, such as a bicycle, a motorcycle, a kayak, a canoe, or the like, in bad weather or at night.

Specifically, according to the present invention, the radar reflector is applied to the helmet of an occupant disposed at the highest position in an object, and the number of angles formed by the plurality of reflection units may be increased, such that the reflectance may be compensated even in the situation that the recognition performance of radar equipment is deteriorated.

In addition, according to the present invention, the visibility of the radar reflector in bad weather or at night may be directly improved by applying the light emitting module to the radar reflector.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Hereinafter, a helmet provided with a radar reflector according to a preferable embodiment of the present invention will be described in detail with reference to the accompanying drawings.

Figure 1:
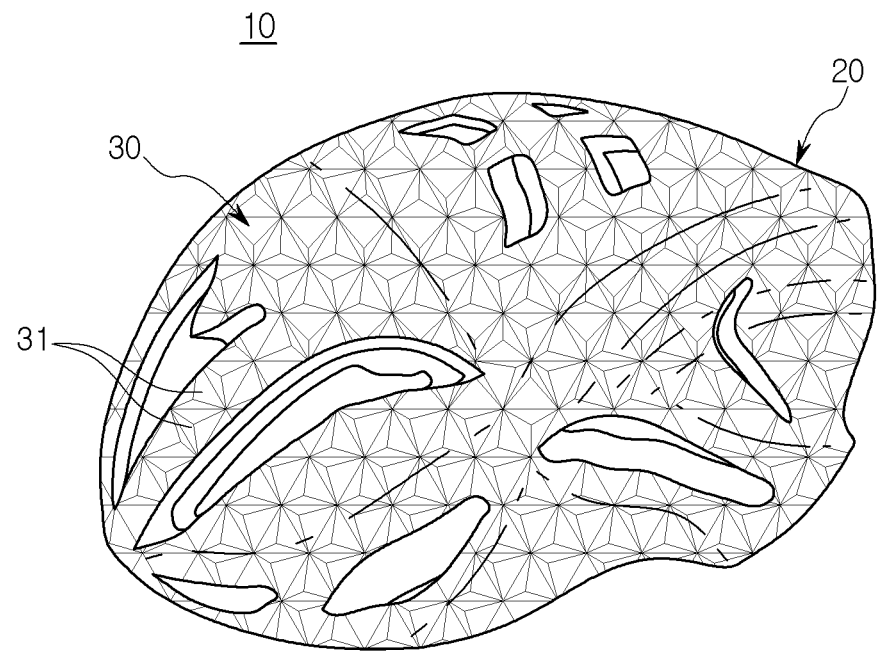
FIG. 1 is a perspective view showing a helmet provided with a radar reflector according to a preferred embodiment of the present invention.
Figure 2:
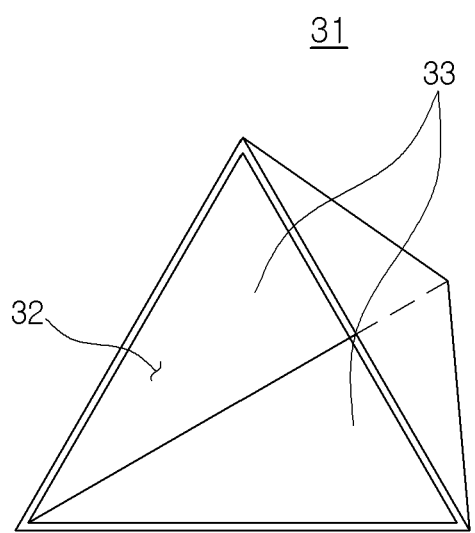
FIG. 2 is an enlarged view of the reflection unit shown in FIG. 1.

FIG. 1 is a perspective view showing a helmet provided with a radar reflector according to a preferred embodiment of the present invention. FIG. 2 is an enlarged view of the reflection unit shown in FIG. 1.

Although the present embodiment will be described with a bicycle helmet used in riding a bicycle, the present invention is not limited thereto. In addition, it should be noted that the present invention may be applied to various helmets such as a motorcycle helmet, or a helmet used in using a small boat, a yacht, a canoe or a kayak, as well as a bicycle helmet.

Hereinafter, terms representing directions such as 'left', 'right', 'forward', 'rearward', 'upward' and 'downward' are defined as respective directions based on the states shown in the respective drawings.

As shown in FIG. 1, a helmet 10 provided with a radar reflector according to a preferable embodiment of the present invention may include a helmet body 20 formed in a shape corresponding to a shape of a user head, and a radar reflector 30 mounted on an outer surface of the helmet body 20 to reflect a radar signal transmitted from radar equipment.

The helmet body 20 may be formed in a substantially spherical shape corresponding to the shape of a user head.

Of course, the present invention is not limited to the above, but a the shape of the helmet 10 may be variously changed according to the purpose or use of the helmet 10, such as a hemispherical shape covering the upper part of a user head, a helmet shape covering the head and the face of a user, or the like.

The efficiency of the radar reflector 30 is affected by the height and angle of the radar reflector 30.

That is, a radar cross section (RCS) is a plane area that is defined to represent the reflectance of an object when the electromagnetic waves radiated from a radar are reflected back to the object.

In this case, since the radar reflectance varies depending on the shape of a reflector, the intensity of a reflected wave is represented by a flat metal plate area having the same reflectance.

Meanwhile, the material and the shape of an object such as an airplane that should not be detected in the radar are selected such that the radar reflection area of the object becomes small.

However, in the present embodiment, the radar reflector 30 has a material and a shape which are capable of effectively reflecting the radar signal to improve the recognition rate.

To this end, the radar reflector 30 may include a plurality of reflection units 31 arranged on the entire outer surface of the helmet body 20.

As shown in FIG. 2, each of the reflection units 31 may be formed in a trigonal pyramid shape having one opened surface.

That is, when the radar signal is input through the opened surface 32, the reflection unit 31 may reflect the radar signals which are input in various directions using the reflection surfaces 33 formed inside the opened surface.

The reflection unit 31 may be made of a metal material such as aluminum or titanium to reflect the radar signal.

Alternatively, the reflection unit 31 may be recessed in the trigonal pyramid shape at the outer surface of the helmet body 20 made of a synthetic resin material, and a thin film made of a metal material may adhere to each reflection surface 33.

In addition, a reflection layer may be formed on each reflection surface by coating a paint containing metal powder or a reflective material on each reflection surface 33.

In this case, a frequency of the radar signal used for a general vehicle radar may be about 77 a and a wavelength of the radar signal may be about 4 mm.

Therefore, each side of the reflection unit 31 is preferably formed to have a length longer than the wavelength of the vehicle radar that is, 4 mm.

As described above, the present invention may effectively reflect the radar signal incident in various directions from a vehicle radar or radar inspection equipment for detecting presence/absence of a bicycle, a moving speed, a moving direction, a distance from a bicycle.

Accordingly, the present invention may improve the recognition rate by applying a radar reflector to a helmet of a user aboard a fast moving object such as a bicycle or a motorcycle in bad weather or at night.

Specifically, the present invention may apply a radar reflector to the helmet of an occupant disposed at the highest position on an object such as a bicycle, a motorcycle, a kayak, a canoe, or the like, and may increase the number of angles formed by the plurality of reflection units, such that the reflectance of a radar or radar inspection equipment may be compensated even in a situation that the recognition performance of a radar or radar inspection equipment is deteriorated.

Meanwhile, the radar reflector applied over the entire outer surface of a bicycle helmet has been described in the embodiment, but the present invention is not limited thereto.

Figure 3:
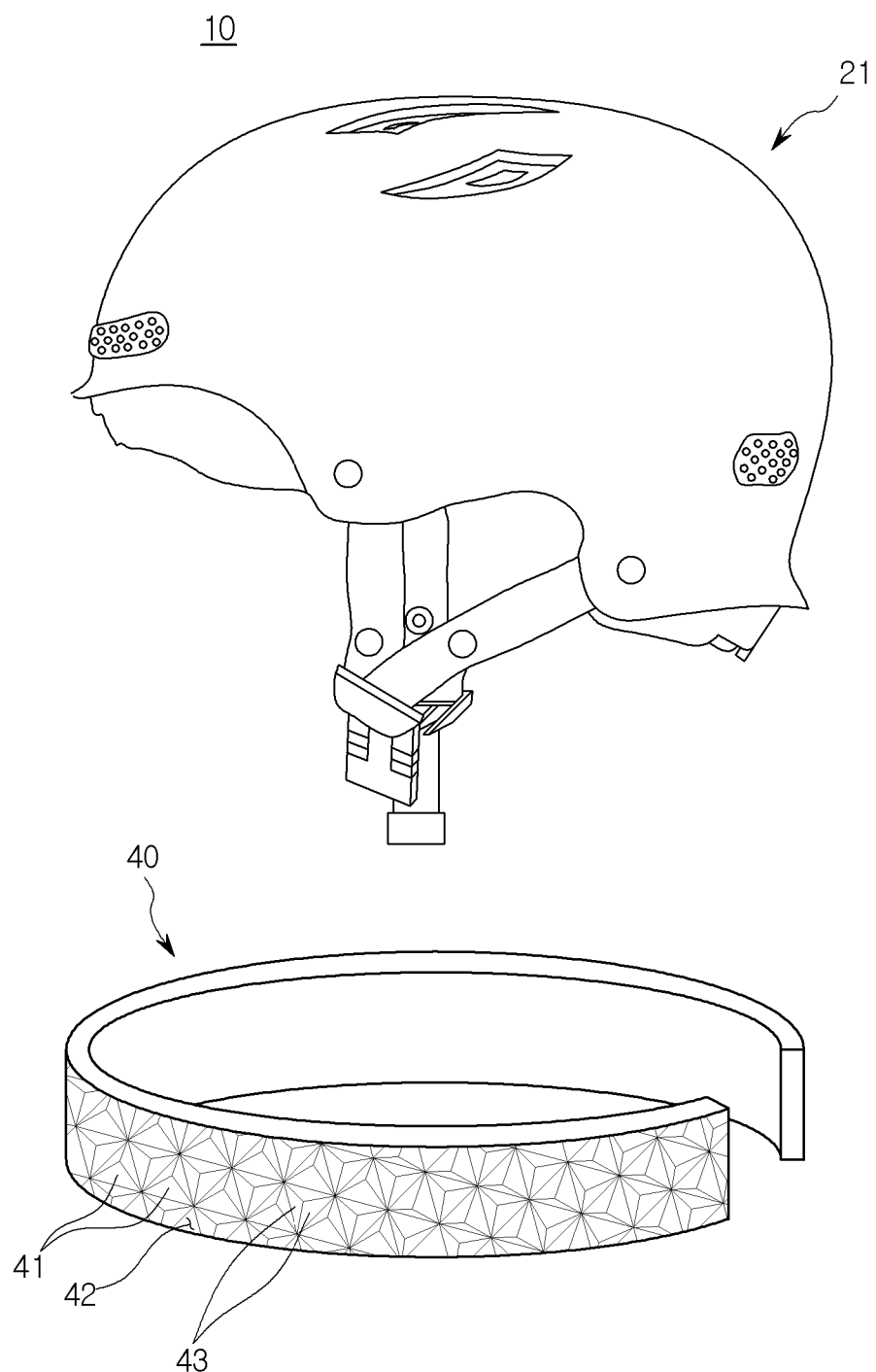
FIG. 3 is a view showing a helmet provided with a radar reflector according to another embodiment of the present invention.

FIG. 3 is a view showing a helmet provided with a radar reflector according to another embodiment of the present invention.

FIG. 3 shows a configuration of a radar reflector 40 mounted on a part of the outer surface of the helmet body 20.

As shown in FIG. 3, a radar reflector 40 applied to another embodiment of the present invention may be partially mounted on the outer surface of a helmet body 21 depending on the use or shape of the helmet 10.

To this end, the radar reflector 40 may be formed with the plurality of reflection units 41 arranged in a plurality of rows to be formed in a headband shape or a band shape.

That is, the radar reflector 40 may be prepared separately from the helmet body 21, and like a headband or a band, may be installed along an outer periphery of the helmet body 21 by using adhesive or Velcro in an attachment manner.

Of course, the present invention may be modified to couple the helmet body 21 and the radar reflector 40 in such a coupling manner that a plurality of coupling grooves formed in the helmet body 21 is coupled with a plurality of coupling protrusions formed on the inner surface of the radar reflector 40.

Therefore, the present invention may effectively reflect a radar signal by easily installing a radar reflector on various helmets regardless of the shape or use of the helmet.

In addition, according to the present invention, in the case where there is no need to wear a helmet, the recognition rate of the radar equipment may be improved by wearing only the radar reflector on the head of a user or installing the radar reflector on a cap.

Figure 4:
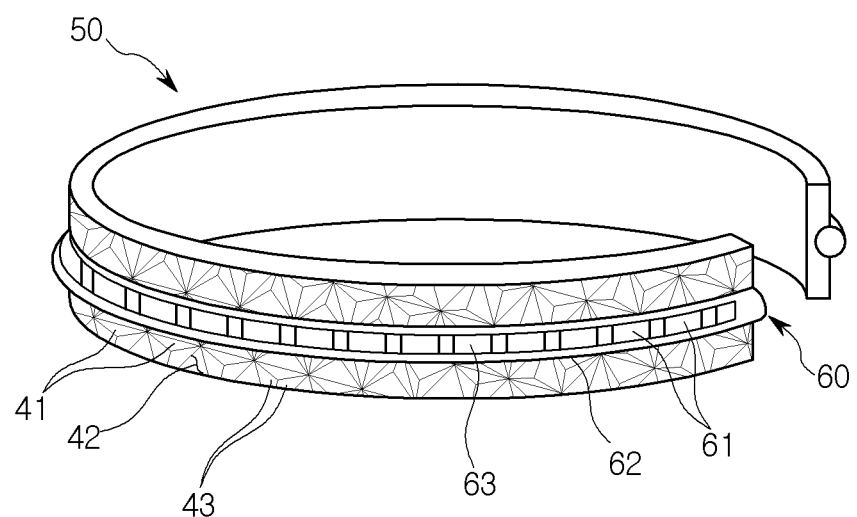
FIG. 4 is a view showing a helmet provided with a radar reflector according to still another embodiment of the present invention.

FIG. 4 is a view showing a helmet provided with a radar reflector according to still another embodiment of the present invention.

As shown in FIG. 4, the configuration of a radar reflector 50 applied to a helmet according to still another embodiment may be similar to that of the radar reflector 40 described with reference to FIG. 3, and the radar reflector 50 may further include a light emitting module 60 for emitting light to a periphery thereof by turning on or on/off a plurality of LEDs.

The light emitting module 60 may include a transparent tube 62 installed in a longitudinal direction of the radar reflector 50, an LED strip 63 provided in the transparent tube 62 and provided with the plurality of LEDs 61 mounted at predetermined intervals, and a power supply unit (not shown) for supplying power to the LED strip 63.

Thus, according to the present invention, the visibility of the radar reflector in bad weather or at night may be directly improved by applying the light emitting module to the radar reflector.

As described above, the radar reflector is applied to the helmet of a user aboard an object to be detected by using the radar signal, so that the radio may be effectively reflected even in bad weather or at night, thereby improving the recognition rate of the radar equipment.

Although an exemplary embodiment of the present invention has been described for illustrative purposes, those skilled in the art will appreciate that various modifications, additions and substitutions are possible, without departing from the scope and spirit of the invention as disclosed in the accompanying claims.

That is, although the radar reflector applied to a bicycle helmet and a kayak helmet has been described in the embodiments, but the present invention is not necessarily limited thereto. In addition, the radar reflector may be modified to be applicable to various helmets such as a motorcycle helmet, or a helmet used in using a small boat, a yacht, a canoe or a kayak, as well as a bicycle helmet or a kayak helmet.

The present invention may be applied to a technique that effectively reflects a radar signal even in bad weather or at night by applying the radar reflector to the helmet of a user aboard an object to be detected by using the radar signal, thereby improving the recognition rate of radar equipment.

What is claimed is:

1. A helmet provided with a radar reflector, the helmet comprising:
   a helmet body formed in a shape corresponding to a shape of a user head; and
   the radar reflector mounted on an outer surface of the helmet body to reflect a radar signal transmitted from radar equipment,
   wherein the radar reflector comprises:
   a plurality of reflection units each concaved in a trigonal pyramid shape having one opened surface, each of the plurality of reflection units reflecting the radar signal; and
   a light emitting module for emitting light to a periphery thereof by turning on or off a plurality of LEDs,
   wherein the radar reflector is mounted over an entire outer surface of the helmet body,
   wherein each of the plurality of reflection units reflects an incident radar signal by using a reflection surface formed inside the opened surface when the radar signal is input through the opened surface,
   wherein a side of each of the plurality of reflection units has a length longer than a wavelength of the radar signal, and
   wherein the light emitting module comprises:
   a transparent tube installed in a longitudinal direction of the radar reflector;
   an LED strip provided in the transparent tube and provided with the plurality of LEDs mounted at predetermined intervals; and
   a power supply unit for supplying power to the LED strip.

2. The helmet of claim 1, wherein each of the plurality of reflection units is formed of a metal material to reflect the radar signal.

3. The helmet of claim 1, wherein each of the reflection units is recessed at the outer surface of the helmet body in the trigonal pyramid shape such that each of the plurality of reflection units is concaved, and
   a thin film formed of a metal material adheres to each reflection surface.

4. The helmet of claim 1, wherein each of the plurality of reflection units is recessed at the outer surface of the helmet body in the trigonal pyramid shape such that each of the plurality of reflection units is concaved, and
    a reflection layer is formed on each reflection surface by coating each reflection surface with a paint containing metal powder or a reflective material.

5. A helmet provided with a radar reflector, the helmet comprising:
    a helmet body formed in a shape corresponding to a shape of a user head; and
    the radar reflector mounted on an outer surface of the helmet body to reflect a radar signal transmitted from radar equipment,
    wherein the radar reflector comprises:
    a plurality of reflection units each concaved in a trigonal pyramid shape having one opened surface, each of the plurality of reflection units reflecting the radar signal; and
    a light emitting module for emitting light to a periphery thereof by turning on or off a plurality of LEDs,
    wherein each of the plurality of reflection units are arranged in a plurality of rows to be formed in a headband shape or a band shape, and mounted on the outer surface of the helmet body in a partial attachment scheme or a coupling scheme,
    wherein each side of each of the plurality of reflection units has a length longer than a wavelength of the radar signal, and
    wherein the light emitting module comprises:
    a transparent tube installed in a longitudinal direction of the radar reflector;
    an LED strip provided in the transparent tube and provided with the plurality of LEDs mounted at predetermined intervals; and
    a power supply unit for supplying power to the LED strip.

6. The helmet of claim 5, wherein each of the plurality of reflection units is formed of a metal material to reflect the radar signal.

7. The helmet of claim 5, wherein each of the plurality of reflection units is recessed at the outer surface of the helmet body in the trigonal pyramid shape such that each of the plurality of reflection units is concaved, and
    a thin film formed of a metal material adheres to each reflection surface.

8. The helmet of claim 5, wherein each of the plurality of reflection units is recessed at the outer surface of the helmet body in the trigonal pyramid shape such that each of the plurality of reflection units is concaved, and
    a reflection layer is formed on each reflection surface by coating each reflection surface with a paint containing metal powder or a reflective material.

\* \* \* \* \*